United States Patent [19]

LaValley

[11] 4,154,687
[45] May 15, 1979

[54] REPLACEABLE VALVE SEAT FOR CENTER VALVE FILTER DRUM

[75] Inventor: Richard W. LaValley, Vancouver, Wash.

[73] Assignee: LaValley Industrial Plastics, Inc., Vancouver, Wash.

[21] Appl. No.: 950,981

[22] Filed: Oct. 13, 1978

[51] Int. Cl.² ............................................. B01D 33/08
[52] U.S. Cl. .................................. 210/392; 210/404; 210/429
[58] Field of Search ............... 210/392, 404, 429, 402, 210/403, 430

[56] References Cited

U.S. PATENT DOCUMENTS

| | | | |
|---|---|---|---|
| 3,233,736 | 2/1966 | Vernay | 210/404 |
| 3,327,862 | 6/1967 | Carlsmith | 210/392 |
| 3,327,863 | 6/1967 | Turner, Jr. | 210/392 |
| 3,517,818 | 6/1970 | Luthi | 210/392 |
| 3,530,992 | 9/1970 | Turner, Jr. | 210/392 |

Primary Examiner—William A. Cuchlinski, Jr.

[57] ABSTRACT

A rotary drum filter of the center valve type has replaceable valve seats in the form of pairs of opposed arcuate valve seat segments which are threadedly connected to channel sidewall portions of the drum in the region of the annular channel which receives the relatively stationary arcuate valve member. Each valve seat segment has a corner indentation between radially and axially outer faces thereof for seating the valve member.

5 Claims, 5 Drawing Figures

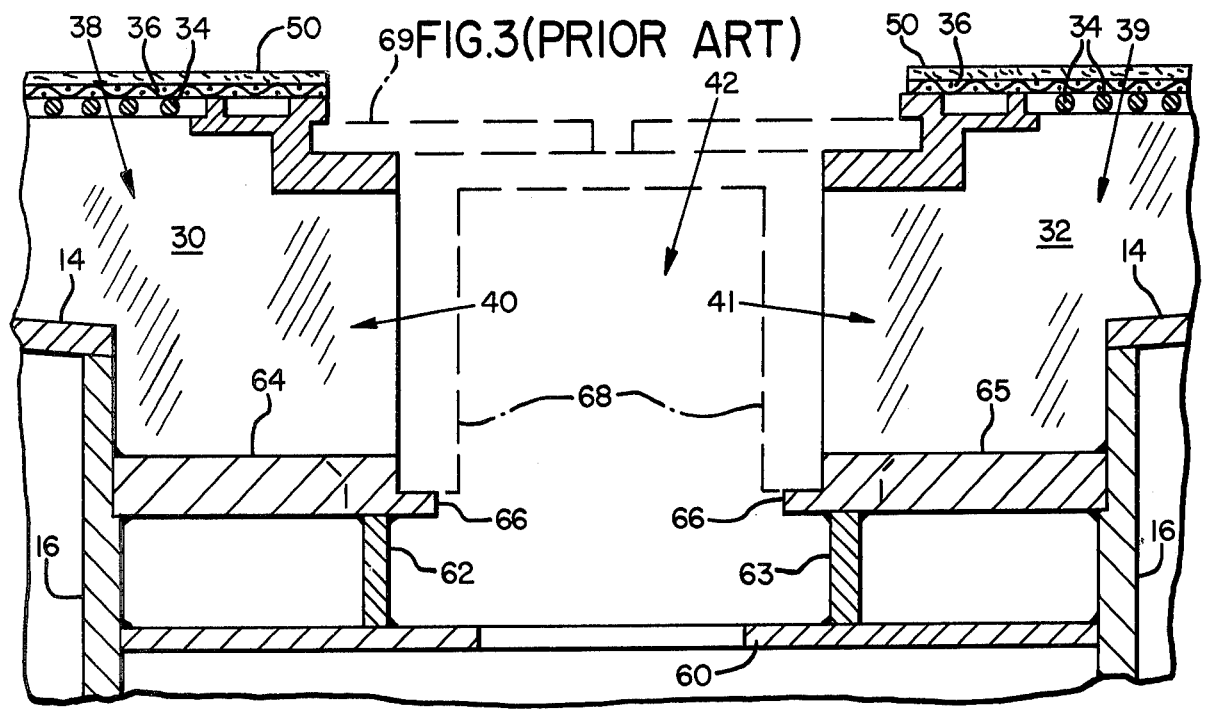
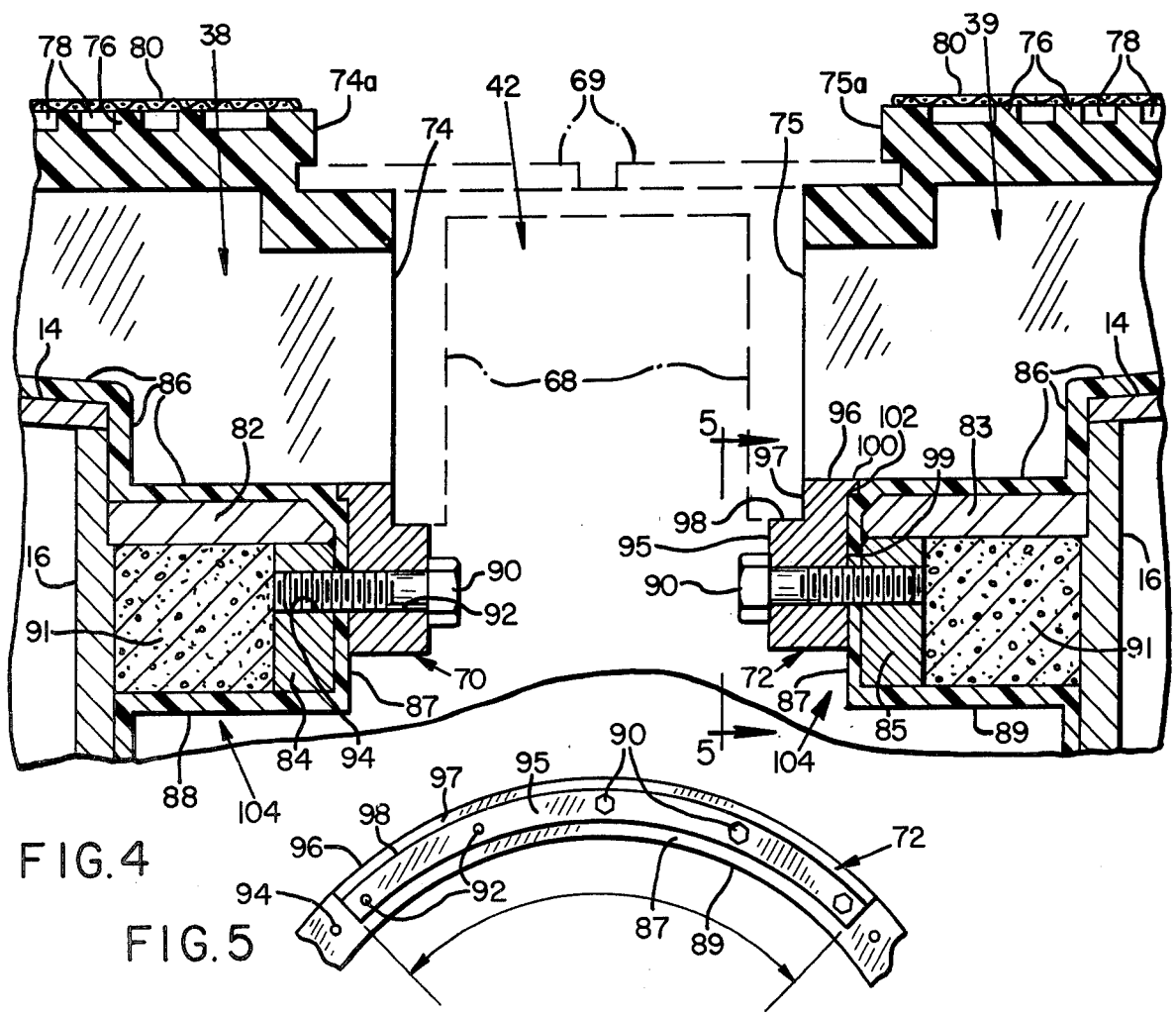
FIG. 4
FIG. 5

REPLACEABLE VALVE SEAT FOR CENTER VALVE FILTER DRUM

BACKGROUND OF THE INVENTION

1. Field of the Invention

The present invention relates to rotary drum filters of the center valve type, and more particularly to a replaceable valve seat for the valve member of such a filter.

2. Description of the Prior Art

Rotary drum filters of the center valve type are commonly used in the pulp and paper making industry to separate wood pulp from its filtrate. The drum filter comprises a rotary drum partially submerged in a tank of pulp slurry. The drum has axially extending filtrate compartments spaced about its periphery, with such compartments covered by a filter screen. Each filtrate compartment opens into a center circumferential channel of the drum in communication with a source of subatmospheric pressure. An arcuate stationary valve member is mounted within and extends partially about the channel. As the drum rotates about its axis with subatmospheric pressure applied, the screen rotates through the pulp slurry, collecting a wet mat of fibers from the slurry. As the screen emerges from the tank, filtrate is drawn through the screen and compartments into the center channel and from there discharged through suitable piping from the drum to remove liquid from the mat. As the drum continues its rotation, the stationary valve member periodically blocks off the filtrate compartment outlets from the source of subatmospheric pressure, thereby enabling removal of the pulp mat from the surface screen.

In conventional center valve filter drum construction, as shown, for example, in FIG. 3 of the application drawings, and also as shown in slightly different form in Turner, Jr., U.S. Pat. No. 3,327,863, the valve seat portions of the drum within the central channel, which embody the wear surfaces in sliding contact with the stationary valve member, are fabricated as integral portions of structural members of the drum. However, such valve seat surfaces are commonly subject to rapid wear because of their continual exposure to highly abrasive and often chemically active filtrate liquids. Oftentimes the operating life of such valve seats is exceedingly short as compared to the overall useful life of the filter drum itself. However, because such valve seats are usually integrated with the structural members of the drum, when they wear out the drum must be taken out of service, and either replaced with a new drum or shipped to a repair facility for rebuilding of the channel portion of the drum. Whether a drum is replaced or only rebuilt when its valve seat portion wears out, either choice is expensive and entails considerable lost production time.

Accordingly, a primary object of the present invention is to provide a rotary drum filter of the center valve type with easily replaceable valve seats, which can be replaced quickly and easily in a minimum amount of time, and without removing the drum filter from its production line.

A prior art U.S. Pat. No. 3,327,862 does suggest providing a rotary drum filter of the center valve type with a detachably mounted pair of inner trackway portions upon which a stationary center valve member rides. However, the detachable portions of the ways shown in such patent comprise only a portion of the valve seat. Other portions of the valve seat structure are integrated with the structural members of the drum, and therefore have the same drawbacks as other prior center valve drum filters previously mentioned. Thus, in drums as shown in the aforementioned patent, valve seat portions which become worn out would still require a considerable amount of rebuilding of the channel portions of the drum filter. It is therefore apparent that the only purpose of the detachable inner trackway portions in the aforementioned patent shown is to facilitate installation and removal of the stationary center valve member because of the peculiar internal mounting of such valve member within the drum.

Accordingly, there is a need for a center valve rotary drum filter having an entirely replaceable valve seat so as to prolong the useful life of such filters.

SUMMARY OF THE INVENTION

The present invention is a replaceable valve seat for a rotary drum filter of the center valve type. The replaceable valve seat of the invention is particularly adapted for use with center valve filters of the type in which the stationary center valve member may be removed in a direction radially outwardly of the center channel of the drum. The replaceable valve seat comprises pairs of opposed arcuate valve segments which can be threadedly attached to and removed from sidewall portions of the drum defining its center channel. Each segment is characterized by an indented edge portion defining a shoulder or ledge between the radially and axially outer faces of the segment for receiving the stationary valve member. Each segment also has a rearwardly extending lip portion which mates with a shoulder portion of the channel sidewall. When valve seat segments wear out, they may be easily replaced simply by removing the valve cover on the drum and the valve member itself to gain access to the valve seat segments within the center channel. The worn out seat segments are simply unthreaded from the channel sidewalls and replaced with new segments in very short order, whereupon the drum filter can be placed back into production.

BRIEF DESCRIPTION OF THE DRAWING

In the drawing:

FIG. 3 is a sectional view, on an enlarged scale of a portion of a typical center valve drum filter of the prior art in the region of the center valve mounting portion of the drum;

FIG. 4 is a view similar to FIG. 3 after the drum channel area of FIG. 3 has been reconditioned to accept the replaceable valve seats of the present invention as shown; and FIG. 5 is a side elevational view of one valve seat segment as viewed from Line 5—5 of FIG. 4.

DETAILED DESCRIPTION

General Description of Typical Rotary Drum Filter

Figure 1:
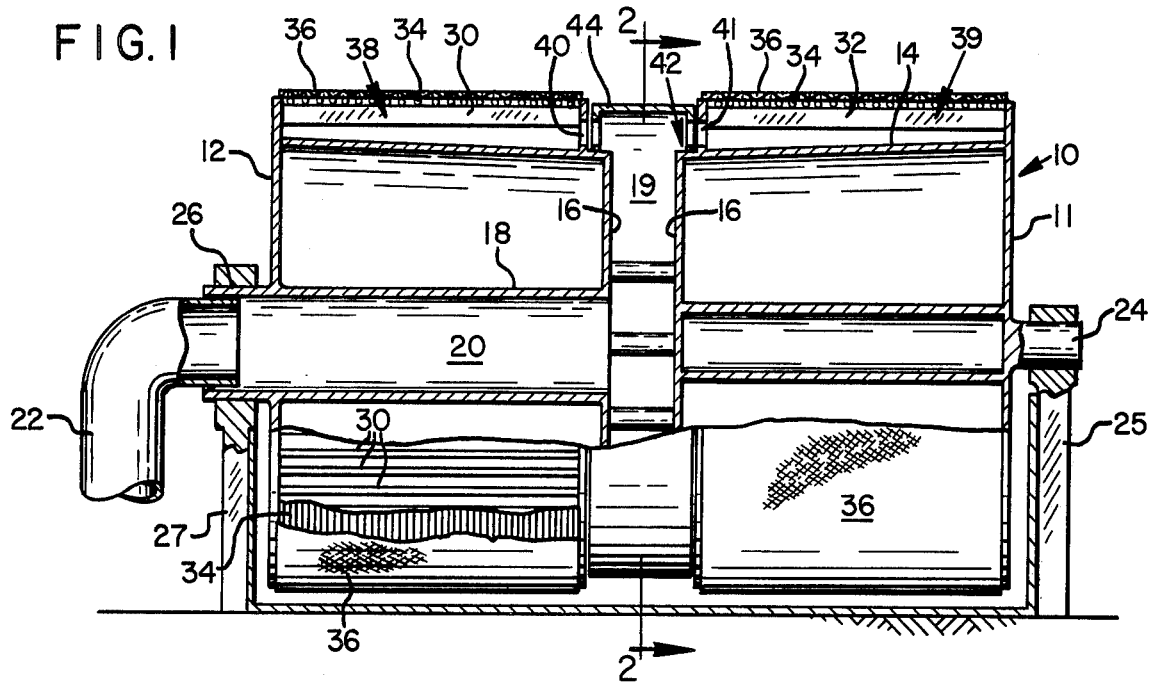
FIG. 1 is a front elevational view of a rotary drum filter of the center valve type with the surface portions of the drum broken away to show interior portions of the drum in section.
Figure 2:
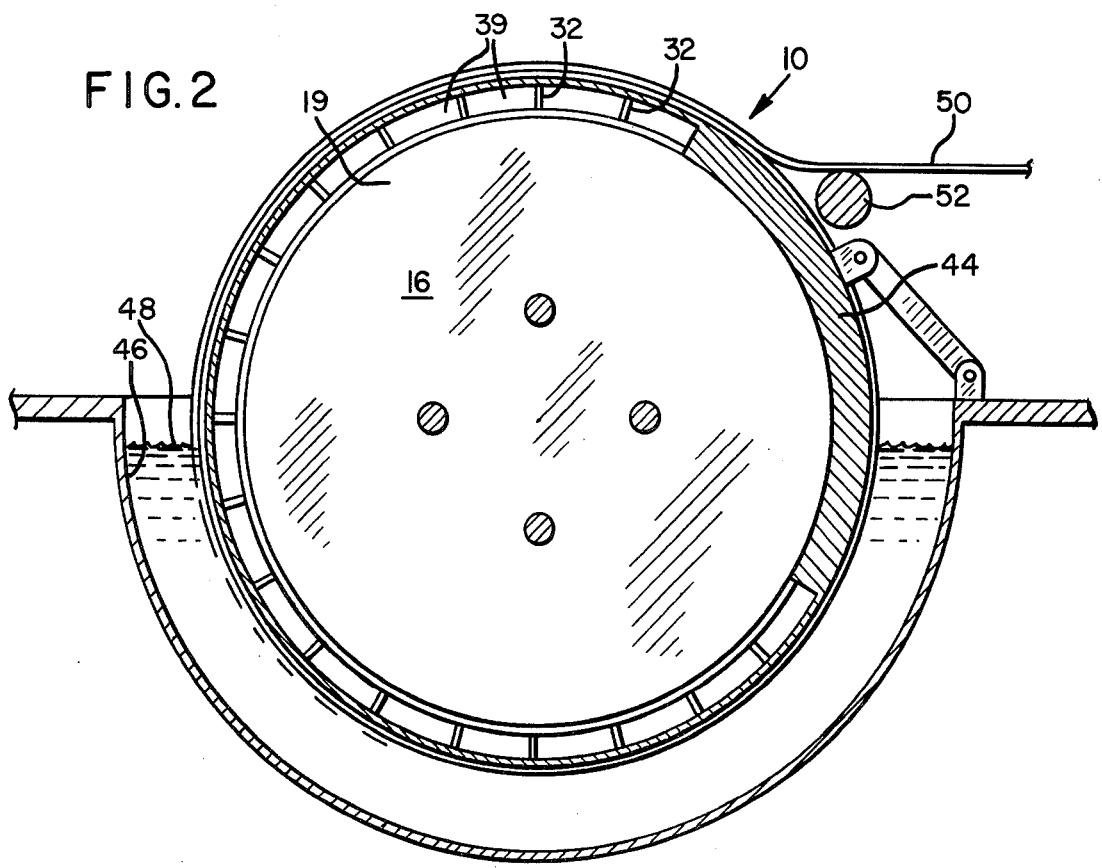
FIG. 2 is a somewhat schematic vertical sectional view taken along the Line 2—2 of FIG. 1.

Referring to FIGS. 1 and 2, a typical rotary drum filter of the center valve type, in which the present invention can be incorporated, includes a generally cylindrical drum 10 with flat opposite end walls 11, 12 and generally cylindrical deck portions 14. Inner end or head walls 16, together with an axial cylindrical inner wall 18 defines an interior drum passage, including a radial passage portion 19 and an axial passage portion 20, the latter of which is connected to an external pipe 22 connected to a source of subatmospheric pressure (not shown). Drum 10 is rotatably mounted by a shaft 24 on a support 25 at one end and by an external extension 26 of interior wall 18 on a support 27 at the opposite end.

Typically, the deck surface 14 supports two sets of circumferentially spaced apart, axially and radially extending ribs 30, 32. The ribs are covered with circumferentially wound wire 34, which supports a surface filter screen 36, defining the filter medium of the drum. The circumferentially spaced ribs 30 and 32 define axially and radially extending sets of filtrate compartments 38, 39, respectively, closed at their axially outer ends but open at their inner ends at 40, 41 to a central circumferentially extending channel 42 of the drum. Channel 42 receives a substantially stationary arcuate valve member 44, which extends through a predetermined arc of the channel as shown in FIG. 2.

Drum 10 is partially submerged in a tank 46 typically containing a pulp slurry 48. As the drum rotates in a clockwise direction as indicated by the arrow in FIG. 2, valve member 44 periodically blocks off each filtrate compartment 38 and 39 from communication with the subatmospheric pressure within drum passages 19, 20 and pipe 22, thereby permitting the removal of a pulp mat 50 from the drum at the roll 52. Mat 50 is formed as follows: As the drum rotates into the slurry a partial vacuum is applied to the filtrate compartments, causing pulp fibers in the slurry to collect on the surface of filter screen 36. As the screen surface emerges from the slurry the vacuum continues to be applied, drawing filtrate liquid from the mat into the filtrate compartments 38, 39. The floors of the compartments formed by deck 14 are sloped toward channel 42, causing the filtrate to flow readily from the open ends of the compartments into channel 42 and through drum passages 19, 20 from the drum to dewater the pulp mat. As each filtrate compartment becomes sealed off from the continuously applied vacuum by the stationary valve member 44, the dewatered pulp mat 50 can be removed from the screen surface.

FIG. 3 shows the center valve mounting portion of a typical rotary drum filter of the prior art before modification to accept the replaceable valve seat of the invention. Such drum includes previously mentioned deck portions 14 and ribs 30, 32 defining filtrate compartments 38, 39 with inner end openings 40, 41 at the center channel 42. Also shown are the previously mentioned inner end or head walls 16 of the drum, which are interconnected by an annular structural connecting member 60 supporting channel sidewall portions 62, 63. Annular structural floor plates 64, 65 define the floor of the filtrate compartments 38, 39 at their entrance openings 40, 41 to channel 42. Axially inwardly extending shoulder portions 66 of floor plates 64, 65 project into channel 42 to define the valve seat which receives the stationary valve member 68 shown in phantom. Also shown in phantom is a valve cover 69, which normally encloses the channel and is carried by the drum. All of the foregoing structural drum members are usually made of a chemically resistant metal such as stainless steel.

As will be apparent from FIG. 3, when the valve seat portions 66 wear out, a considerable amount of refabrication of the structural portions of the drum must occur. Structural members 64, 65 and channel sidewall portions 62, 63 would normally have to be replaced at considerable expense.

REPLACEABLE VALVE SEAT

FIGS. 4 and 5 show a replaceable valve seat means of the invention, comprising pairs of opposed valve seat segments 70, 72.

The replaceable valve seat segments 72 are shown mounted in a rotary drum filter of the type shown in FIG. 3 after such filter has been reconditioned and modified to accept such segments. In the modified filter, a number of the metal structural elements of the drum of FIG. 3 have been removed and replaced by fiberglass-reinforced polyester resin elements. Other structural elements have been coated with a protective layer of such resin. For example, in the drum filter of FIG. 4 metal ribs 30, 32, which define the filtrate compartments 39, 39 have been replaced with ribs 74, 75 capped and coated with fiberglass-reinforced polyester resin. The outer surfaces of rib caps 74a, 75a have been notched to provide axially spaced ridges 76 separated by grooves 78, the ridges supporting filter screen 80. Structural elements 64, 65, 62, 63 and 60 of the drum filter of FIG. 3 have been removed in the modification of FIG. 4 and replaced by annular floor members 82, 83 projecting outwardly of their respective pre-existing inner end wall members 16. Floor members 82, 83 are joined at their outer ends to radially extending and axially projecting annular end wall members 84, 85, respectively. These members, as well as the existing deck and inner end wall portions 14, 16, are coated with a layer of fiberglass-reinforced polyester resin, as shown at 86 and 87. In addition, the lower end of projecting end wall members 84, 85 are joined at their lower ends by fiberglass-reinforced polyester resin bottom wall portions 88, 89 to the resin coated inner end walls 16. Thus, the members 82, 83, 84, 85, 88 and 89 define axially projecting anchors for the valve seat segments 70, 72 and annular spaces 91, which may be filled with a putty. The outer end walls 84, 85 also define sidewalls of the channel 42, replacing elements 62, 63 of FIG. 3. The resin coated elements in FIG. 4 provide abrasion and chemical-resistant surfaces, which, in most cases, will outwear the original corresponding metal surfaces of the drum.

The annular channel sidewall members 84, 85 serve as anchor blocks to which the arcuate valve seat segments 70, 72 are fastened by threaded fasteners 90. For this purpose, such sidewall portions are provided with spaced apart threaded holes 94 which receive fasteners 90.

As shown in FIG. 5, each valve seat segment 70, 72 is arcuate and extends preferably through an arc of 90°. Thus, eight segments, four on each side of the channel, are required for each drum. Each segment is provided along its length with equally spaced apart fastener-receiving through holes 92, which align with the threaded holes 94 in the anchor walls 84, 85 when the valve seat segments are properly positioned within the drum channel.

Each valve seat segment, in cross section, also includes an axially outer face 95 and a radially outer face 96, separated by an indented or cut-away corner portion defined by indented radial and axial surfaces 97 and 98, respectively, defining seating or wear surfaces for engagement with the lower end portions of valve member 68.

Each valve seat segment also has a rear surface 99 which abuts anchor walls 84, 85. The upper end of such rear surface includes a rearwardly projecting lip portion 100, which mates with a corresponding shoulder portion 102 of the resin-coated support structure being indicated generally at 104.

The valve seat segments 70, 72 may be formed of any suitable chemical- and wear-resistant material such as stainless steel, plastic, fiberglass, or the like.

OPERATION

With replaceable valve seat segments as described, existing rotary drum filters may be reconditioned and modified as described to accept the replaceable valve segments. Alternatively, new rotary drum filters can be built to accept such rotary drum filters, using a construction similar to that shown and described.

Whether such valve seat segments are used on modified existing drum filters or on new drum filters, they may be easily replaced. This is accomplished simply by removing the drum's valve cover 69 and valve member 68 from the drum channel in a well known manner and unfastening the worn seat segments from the seat support sidewall portions of the drum channel and fastening new valve seat segments in their places, using the same or new threaded fasteners. The replacement is quick and simple, and is easily performed from outside the drum at the pulp mill with a minimum of lost production time.

Having illustrated and described the principles of my invention in a preferred embodiment, it should be apparent to those persons skilled in the art that such embodiment may be modified in arrangement and detail without department from such principles. I claim as my invention all such modifications as come within the true spirit and scope of the following claims.

I claim:

1. In a rotary drum filter having a central axis of rotation, and means defining axially and radially extending filtrate compartments on a surface portion of said drum throughout the circumference thereof, and valve means for controlling the communication through said drum of a source of subatmospheric pressure with said filtrate compartments, said valve means comprising means defining a circumferentially continuous annular channel within said drum surface in communication with open end portions of said filtrate compartments and with said source, a substantially stationary arcuate valve member positioned within said channel and partially encircling said drum for blocking communication of said open end portions with said source, and means defining an annular valve seat on said drum along opposite sidewall portions of said channel for limiting the radially inward and axial movement of said valve member and providing a seal between said valve member and said drum, thereby periodically to cut off communication between said source and each said filtrate compartment upon rotation of said drum, characterized in that said valve seat means comprises pairs of axially opposed arcuate valve seat segments removably mounted to opposite sidewalls of said channel throughout the circumference of said drum, each said segment including indented surface portions between a radially outer face and an axially outer face thereof providing wear surfaces for engagement with said valve member.

2. Apparatus according to claim 1, wherein each said segment extends through an arc of 90°, and wherein there are a total of eight said segments.

3. Apparatus according to claim 1, wherein each said segment is threadedly affixed to channel sidewall portions for removal therefrom.

4. Apparatus according to claim 1, wherein each opposed channel sidewall portion includes an annular shoulder portion and each said segment includes an arcuate lip portion projecting axially rearwardly from a rear channel sidewall-engaging face of said segment into seated engagement with said shoulder.

5. Apparatus according to claim 4 wherein said channel is partially defined by axially projecting valve seat support portions, each said support portion providing an annular endwall anchor for said valve seat segments and an annular top wall defining a floor of said filtrate compartments at the end openings of said compartments into said channel.

* * * * *